(12) United States Patent
Kleynen

(10) Patent No.: US 8,333,273 B2
(45) Date of Patent: Dec. 18, 2012

(54) RECEIVING AND CONVEYING DEVICE

(75) Inventor: Olivier Kleynen, Brussels (BE)

(73) Assignee: Visar, Brussels (BE)

( * ) Notice: Subject to any disclaimer, the term of this patent is extended or adjusted under 35 U.S.C. 154(b) by 261 days.

(21) Appl. No.: 12/808,572

(22) PCT Filed: Dec. 17, 2008

(86) PCT No.: PCT/EP2008/067698
§ 371 (c)(1),
(2), (4) Date: Jun. 16, 2010

(87) PCT Pub. No.: WO2009/077552
PCT Pub. Date: Jun. 25, 2009

(65) Prior Publication Data
US 2011/0024265 A1     Feb. 3, 2011

(30) Foreign Application Priority Data
Dec. 17, 2007   (BE) .................... 2007/0599

(51) Int. Cl.
*B65G 47/52* (2006.01)
(52) U.S. Cl. ......... 198/535; 198/525; 198/532; 198/534
(58) Field of Classification Search ............... 198/525, 198/527, 529, 532, 534, 535, 539, 542, 570
See application file for complete search history.

(56) References Cited

U.S. PATENT DOCUMENTS

| | | | | |
|---|---|---|---|---|
| 1,111,752 A | * | 9/1914 | Lichtenstein et al. | 198/496 |
| 1,879,016 A | * | 9/1932 | Austin | 131/312 |
| 2,080,197 A | * | 5/1937 | Brandenburg | 15/3.16 |
| 2,296,645 A | * | 9/1942 | Marsden | 198/387 |
| 3,434,273 A | * | 3/1969 | Lovell | 57/300 |
| 3,460,668 A | * | 8/1969 | Gerrans | 198/387 |
| 3,722,663 A | * | 3/1973 | Nalbach | 198/699.1 |
| 3,819,032 A | * | 6/1974 | Preuss et al. | 198/495 |
| 3,986,622 A | * | 10/1976 | Vaughan et al. | 414/142.4 |
| 4,063,642 A | * | 12/1977 | Sticht et al. | 209/540 |
| 4,297,792 A | * | 11/1981 | Harter | 34/380 |
| 4,438,851 A | * | 3/1984 | Voelskow | 209/616 |
| 4,978,252 A | * | 12/1990 | Sperber | 406/64 |
| 5,671,838 A | * | 9/1997 | Bowman | 198/496 |

(Continued)

FOREIGN PATENT DOCUMENTS

DE     3238683     4/1984

(Continued)

OTHER PUBLICATIONS

International Search Report in PCT/EP2008/067698 dated Apr. 21, 2009 (6 pages).

*Primary Examiner* — Douglas Hess
(74) *Attorney, Agent, or Firm* — McCracken & Frank LLC

(57) ABSTRACT

A device for receiving and transporting objects in a direction substantially different from the vertical is disclosed. The device includes a conveyor belt arranged in a transport direction and a row of flexible elements attached alongside and above the conveyor belt. Each row of flexible elements is inclined downwards, so as to present less mechanical resistance to a force oriented downwards than upwards. The device also includes a transport belt coupled to the conveyor belt wherein each row of flexible elements is fixed to the transport belt.

15 Claims, 1 Drawing Sheet

U.S. PATENT DOCUMENTS

Figure 1:
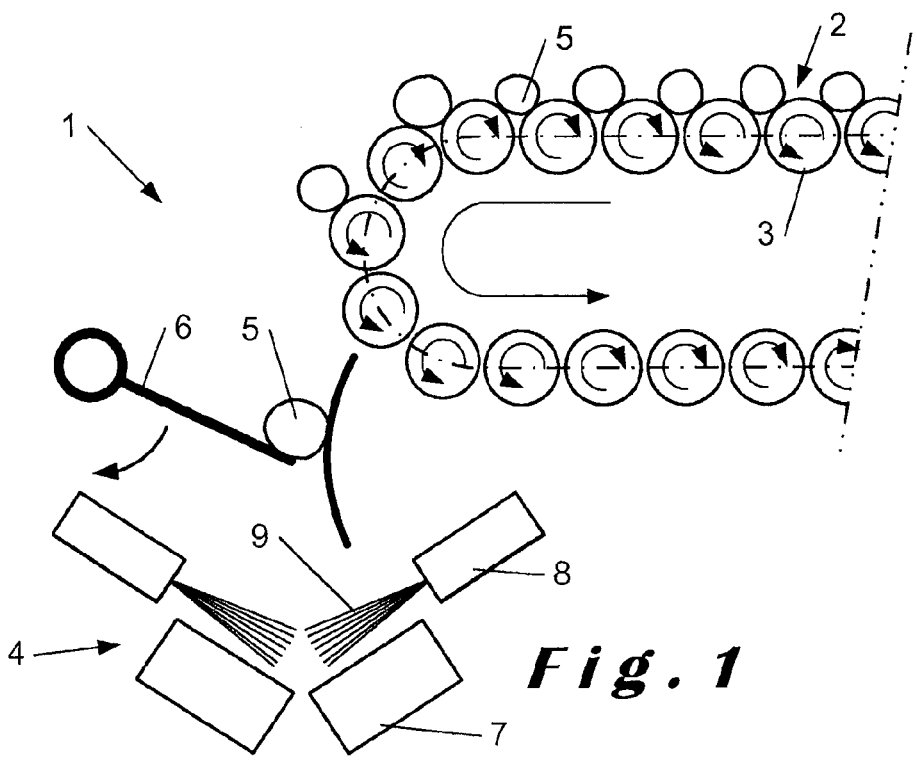

| | | | | |
|---|---|---|---|---|
| 5,687,833 A * | 11/1997 | Dalessio et al. | ............... | 198/786 |
| 5,846,129 A * | 12/1998 | Dragt | ............... | 460/144 |
| 6,276,511 B1 * | 8/2001 | Iredi et al. | ............... | 198/382 |
| 6,390,280 B1 * | 5/2002 | Boyce | ............... | 198/540 |
| 6,994,205 B2 * | 2/2006 | Grochowski | ............... | 198/495 |
| 7,240,786 B2 * | 7/2007 | Boyadjian | ............... | 198/496 |
| 7,748,519 B2 * | 7/2010 | Freudelsperger | ........ | 198/550.01 |

FOREIGN PATENT DOCUMENTS

| | | |
|---|---|---|
| DE | 10345613 | 5/2005 |
| EP | 1099632 | 5/2001 |
| FR | 2682941 | 4/1993 |
| GB | 1276361 | 6/1972 |
| GB | 2037186 | 7/1980 |
| JP | 61111221 | 5/1986 |
| JP | 200475380 | 3/2004 |
| JP | 200560102 | 3/2005 |
| WO | 2006125443 | 11/2006 |

\* cited by examiner

RECEIVING AND CONVEYING DEVICE

The present invention relates to a device for receiving falling objects and conveying the said objects in a direction substantially different from vertical, preferably at high speed, comprising a set of conveyor belts in the conveying direction.

When objects impact on a conveyor belt at a certain speed perpendicular to the surface of the said belt, these objects may bounce, which presents serious drawbacks in certain applications, and in particular when it is essential to prevent such objects received on the belt at certain temporal and/or spatial intervals from overlapping.

This problem is posed in particular in certain sorting units, and in particular in certain units sorting fruit or vegetables, such as for example carrots. Such sorting units normally comprise a conveyor with rotary rollers oriented in a first direction, and a conveyor belt oriented in a second direction substantially perpendicular to the first direction. The conveyor belt is placed downstream and below the rotary-roller conveyor, so that objects conveyed first of all in the first direction and at a first speed on the roller conveyer then fall onto the transport device in order to be transported in a second direction substantially perpendicular to the first direction and at a speed substantially greater than the first speed. The objects conveyed in the roller conveyor are housed in concavities delimited by adjacent rollers, so as to orient each object and/or align a plurality of objects in the second direction. The objects aligned and/or oriented in the second direction therefore fall onto the conveyor belt so as to be transported in single file in the second direction for manual and/or automatic individual sorting thereof.

However, with the force of the fall, the objects may bounce, losing their orientation and/or alignment, and/or overlap with one another, which may complicate sorting thereof, in particular automatic sorting thereof.

It has been proposed to equip such conveyor belts with damping devices below the surface of the belt, such as for example in Japanese patent application JP 2005-060102. However, these devices are only moderately effective in preventing the bouncing of the objects falling onto the conveyor belt and also have other drawbacks such as weight and mechanical complexity.

To solve this problem, the device of the invention comprises at least one row, substantially parallel to the transport direction, of flexible elements attached alongside and at a certain distance above the said at least one conveyor belt, and inclined downwards, so as to have less mechanical resistance downwards than upwards, each row of flexible elements being fixed to a conveyor belt.

The flexible elements therefore form a kind of non-return valve for the objects falling onto the conveyor belt, allowing them to arrive on the belt easily, but preventing bouncing thereof in the opposite direction, the mechanical resistance of the flexible elements adapting to the length, and therefore indirectly to the weight, of each falling object, and the flexible elements being able to move with the object during transport thereof on the conveyor belt, thus avoiding breaking them. For the latter reason, it is therefore also advantageous for this transporter to be synchronised with the set of conveyor belts.

Preferably, each row comprises flexible elements with several lengths. In this way, the device can prevent the bouncing of objects with a variety of diameters.

Preferably the device comprises at least one of the said rows of flexible elements on each side of the set of conveyor belts, and this also for great efficacy against bouncing.

Preferably, in order to prevent even better the bouncing of falling objects, as well as preventing the lateral movement of the objects during transport thereof, the said set of conveyor belts comprises at least two parallel conveyor belts inclined laterally towards each other in the form of a V.

The invention also relates to a sorting unit comprising:
a rotary-roller conveyor oriented in a first direction, and
a reception and transport device according to the invention, placed, with a transport direction substantially perpendicular to the said first direction, downstream of and below the said conveyor.

Such a sorting unit therefore makes it possible to present, one by one, objects substantially aligned and oriented in a single direction for inspection and switching thereof.

When a set of objects with different diameters are aligned between the same two rollers, it is possible, at the end of travel of the conveyor, for the objects with the largest diameter to fall before the falling of those with a smaller diameter, which may cause objects of different diameters to overlap. In order to ensure that a whole set of objects aligned by the conveyor falls simultaneously or almost so on the reception and transport device, and preventing such overlaps, it is therefore preferable for the sorting unit to comprise in addition a rocking/swinging plate between the said conveyor and the said device, synchronised with the said conveyor in order to allow a whole row of objects aligned by the conveyor to fall substantially simultaneously onto the said device.

Preferably, in order to push the objects conveyed in the interstices between adjacent rollers, the rotary-roller conveyor comprises at least one flexible plate, preferably made from plastics material, disposed above the rollers of the conveyor and oriented substantially perpendicular to the said first direction.

Preferably, in order to facilitate automatic inspection of the objects, the sorting unit also comprises sensors for inspecting physical and/or chemical parameters of objects transported by the said device. Such sensors could for example be optical sensors but also, alternatively or in complement, other types of sensor.

Preferably, in order to facilitate the automatic switching of the objects after inspection, in addition means of switching objects transported by the said device. Such switching means may comprise for example a door, flap or plate, or a deflector or guide, with actuation by mechanical, electrical and/or fluidic means.

Details concerning a particular embodiment of the invention are described below, in an illustrative but not restrictive manner, referring to the drawings.

Figure 1A:
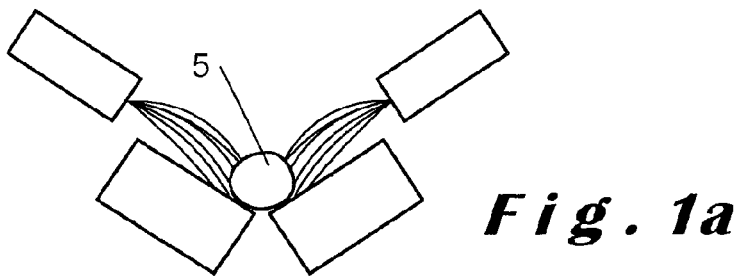
Figure 2:
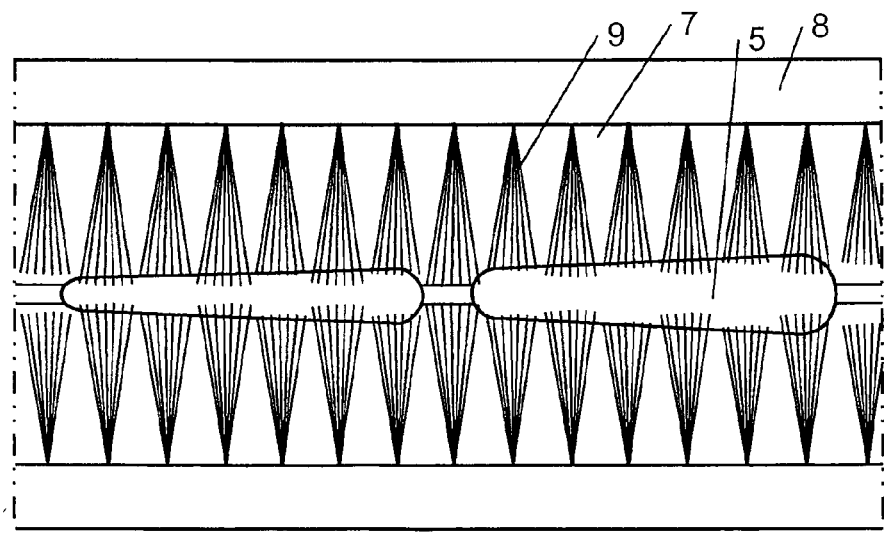

FIG. 1 shows a schematic transverse view of a sorting unit according to one embodiment of the invention, FIG. 1a is a schematic transverse view of a reception and transport device in the sorting unit of FIG. 1 during the transportation of an object, and FIG. 2 shows a schematic view from above of the reception and transport device illustrated in FIG. 1a.

In FIG. 1 a sorting unit 1 according to one embodiment of the invention is illustrated. The sorting unit 1 illustrated is particularly useful for sorting elongate vegetables, such as for example carrots. It is however obvious that a person skilled in the art could apply the principles of the invention in other fields, both in the food sector and in other sectors.

The sorting unit 1 illustrated comprises a conveyor 2 with rollers 3 oriented in a first direction, a device 4 placed downstream and below the conveyor 2 for receiving the objects 5 falling at the end of travel of the conveyor 2 and transporting them in a direction substantially perpendicular to the said first direction, and a rocking/swinging plate 6 placed between the said conveyor 2 and the said device 4 for receiving and transporting objects 5. In the preferred embodiment for sorting carrots, the said rocking/swinging plate 6 is placed at approximately 15 cm above the device 4.

In the embodiment illustrated in FIG. 1, the device 4 comprises two parallel conveyor belts 7 inclined laterally towards each other in the form of a V. The conveyor belts 7 are coupled so as to move at substantially the same speed. The conveyor belts 7 are preferably made from elastomer material such as for example the material sold under the brand name Lintatex®. In addition, the device 4 also comprises a brush belt 8 at each side of the conveyor belts 7. The brush belts 8 are also coupled to the conveyor belts 7 in order to move at substantially the same speed as these.

As can be seen in FIG. 2, a plurality of brushes 9 inclined downwards are arranged on each brush belt 8 in at least one row substantially parallel to the transportation direction of the two conveyor belts 7, and at a certain distance above the said two conveyor belts 7. Each brush belt 8 comprises brushes 9 of several lengths.

In operation, the rollers 3 advance in a first direction towards the device 4, while turning about their own axes. Preferably, the direction of rotation of each roller 3 reverses periodically, for example when each roller 3 moves by a distance corresponding to three roller diameters. Objects 5 conveyed by the said conveyor 2 are thus housed in the interstices between adjacent rollers 3. If these objects 5 are elongate, they are thus oriented in a direction substantially perpendicular to the direction of conveying. Thus, if the width of the conveyor, that is to say the length of the rollers 3, so permits several objects 3 can be aligned in each interstice between two rollers 3, forming rows of objects in a direction substantially perpendicular to the conveying direction. In order to facilitate the alignment and/or orientation of the objects by forcing the objects 5 to be housed in the said interstices, the conveyor 2 can also comprise flexible plates (not illustrated) placed substantially perpendicular to the conveying direction, above the rollers 3. These flexible plates may for example be made from elastomer material such as rubber.

Arriving at the end of travel of the conveyor 2 with rollers 3, the objects 5 fall. However, if several objects 5 with different diameters are aligned in a row of objects 5 between two adjacent rollers 3, those with the largest diameter may fall before those with a smaller diameter. In order to prevent this drawback, in the sorting unit 1 of the embodiment illustrated, the rocking/swinging plate 6 is synchronised with the conveyor 2, so as to temporarily retain the objects 5 in their fall and then release all the objects 5 in a row substantially simultaneously.

From the rocking/swinging plate 6, the objects 5 fall onto the device 4. The brushes 9, flexible and inclined downwards, only slightly oppose resistance to the falling of the objects 5. They retain them and nevertheless substantially prevent their bouncing in the opposite direction when the objects 5 arrive on the conveyor belts 7, as illustrated in FIG. 1a. The different lengths of the brushes 9 make it possible to retain falling objects 5 with a variety of diameters. Once on the conveyor belts 7, the objects 5 are transported in a direction substantially perpendicular to that of the conveyor 2. Preferably, the speed of transport of the objects 5 on the device 4 is such that they are moved by a length equal to or greater than the width of the conveyor 2 with rollers 3 in the interval of time necessary for each roller 3 to reach the position of the previous roller 3. In this way, all the objects 5 aligned on a row are discharged in the direction of transport in the device 4 before the arrival of the following row. A reasonable transport speed in a carrot sorting unit is around 3 m/s.

Thus the device 4 transports the objects 5 in single file and at high speed for individual inspection and sorting thereof. The said inspection may for example be carried out automatically with optical sensors, in particular in artificial vision units. Other inspection means, automatic or not, would however be able to be envisaged by a person skilled in the art according to circumstances, or particular applications. After inspection, switching means, not illustrated, can direct each object 5 in several alternative directions according to the result of the inspection. Such switching means may comprise for example a door, flap or plate, or a deflector or guide, actuated by mechanical, electrical and/or fluidic means.

Although the present invention has been described with reference to specific example embodiments, it is obvious that various modifications and changes can be made to these examples without departing from the general scope of the invention as defined by the claims. For example, a reception and transport device such as the device 4 illustrated could be envisaged without necessarily associating it with a roller conveyor or a rocking/swinging plate like the ones illustrated. Thus the device could comprise a different number of conveyor belts. It could for example have only one conveyor belt. Alternatively, it could also comprise more than two conveyor belts, such as for example three parallel conveyor belts arranged in a U. It could also comprise only one brush belt, or other types of flexible element such as for example flexible tongues instead of brushes 9. In certain circumstances, these flexible elements could even not move with the conveyor belts, even if this would give rise to a certain amount of friction with the objects being transported on the belts. Consequently the description and drawings must be considered in an illustrative rather than restrictive sense.

REFERENCES IN THE FIGURES

1 Sorting unit
2 Roller conveyor
3 Rollers
4 Reception and transport device
5 Object
6 Rocking/swinging plate
7 Conveyor belt
8 Brush belt
9 Brush

The invention claimed is:

1. A device for receiving falling objects and transporting said objects in a direction substantially different from the vertical, the device comprising:
   at least one conveyor belt arranged in the transport direction;
   at least one row of flexible elements attached alongside and at a certain distance above said at least one conveyor belt and arranged to be substantially parallel to the transport direction, each row of flexible elements being inclined downwards, so as to present less mechanical resistance to a force oriented downwards than upwards; and
   at least one transport belt coupled to said at least one conveyor belt, each row of flexible elements being fixed to said transport belt.

2. A device according to claim 1, in which said flexible elements in each row comprises flexible elements with several lengths.

3. A device according to claim 2, in which said flexible elements are in the form of brush bristles made from plastics material.

4. A device according to claim 2, further comprising at least one of said rows of flexible elements arranged on each side of said at least one conveyor belt.

5. A device according to claim 2, in which said at least one conveyor belt comprises at least two parallel conveyor belts coupled together and inclined laterally towards one another in the form of a V.

6. A device according to claim 1, in which said flexible elements are in the form of brush bristles made from plastics material.

7. A device according to claim 6, further comprising at least one of said rows of flexible elements arranged on each side of said at least one conveyor belt.

8. A device according to claim 6, in which said at least one conveyor belt comprises at least two parallel conveyor belts coupled together and inclined laterally towards one another in the form of a V.

9. A device according to claim 1, further comprising at least one of said rows of flexible elements arranged on each side of said at least one conveyor belt.

10. A device according to claim 9, in which said at least one conveyor belt comprises at least two parallel conveyor belts coupled together and inclined laterally towards one another in the form of a V.

11. A device according to claim 1, in which said at least one conveyor belt comprises at least two parallel conveyor belts, coupled together and inclined laterally towards one another in the form of a V.

12. A sorting unit comprising:
a conveyor with rotary rollers oriented in a first direction; and
a device according to claim 1, placed downstream of and below said conveyor with a transport direction substantially perpendicular to said first direction.

13. A sorting unit according to claim 12, further comprising a rocking/swinging plate between said conveyor and said device, said rocking/swing plate being synchronised with said conveyor in order to drop a whole row of objects aligned by the conveyor substantially simultaneously onto said device.

14. A sorting unit according to claim 12, further comprising means of switching objects transported by said device.

15. A sorting unit according to claim 12, adapted for sorting fruit or vegetables, in particular roots such as carrots.

* * * * *